(12) United States Patent
Kojima

(10) Patent No.: US 8,752,947 B2
(45) Date of Patent: Jun. 17, 2014

(54) INK JET RECORDING METHOD AND LIQUID DISPERSANT

(75) Inventor: Mariko Kojima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 198 days.

(21) Appl. No.: 13/281,606

(22) Filed: Oct. 26, 2011

(65) Prior Publication Data

US 2012/0133703 A1 May 31, 2012

(30) Foreign Application Priority Data

Nov. 29, 2010 (JP) ................................ 2010-265209

(51) Int. Cl.
| | | |
|---|---|---|
| B41J 2/01 | (2006.01) | |
| B41J 2/21 | (2006.01) | |
| B41M 5/00 | (2006.01) | |
| C08K 5/00 | (2006.01) | |
| C08K 5/19 | (2006.01) | |
| C08L 83/04 | (2006.01) | |
| C08L 101/02 | (2006.01) | |

(52) U.S. Cl.
CPC .............. *B41J 2/2114* (2013.01); *B41J 2/2107* (2013.01); *B41M 5/0017* (2013.01); *C08K 5/0041* (2013.01); *C08K 5/19* (2013.01); *C08L 83/04* (2013.01); *C08L 101/02* (2013.01)
USPC ................ 347/96; 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101

USPC .......... 347/100, 96, 95, 101, 102, 103, 88, 99, 347/20, 21, 9; 106/31.6, 31.27, 31.13; 523/160, 161
See application file for complete search history.

(56) References Cited

U.S. PATENT DOCUMENTS

| | | | |
|---|---|---|---|
| 7,223,454 B1 * | 5/2007 | Bringley et al. ............ | 428/32.36 |
| 7,284,851 B2 | 10/2007 | Bannai et al. | |
| 7,682,011 B2 | 3/2010 | Namba et al. | |
| 7,810,919 B2 | 10/2010 | Kojima et al. | |
| 8,029,122 B2 | 10/2011 | Kojima et al. | |
| 2003/0078320 A1 * | 4/2003 | Yatake .......................... | 523/160 |
| 2006/0160975 A1 * | 7/2006 | Suda et al. ..................... | 526/330 |
| 2006/0176349 A1 | 8/2006 | Nagai et al. | |
| 2008/0193648 A1 * | 8/2008 | Becker et al. ............... | 106/31.13 |
| 2009/0239044 A1 | 9/2009 | Habashi et al. | |
| 2009/0258196 A1 | 10/2009 | Nagashima et al. | |
| 2009/0263632 A1 | 10/2009 | Kojima et al. | |
| 2010/0112219 A1 | 5/2010 | Yokohama et al. | |
| 2010/0271435 A1 | 10/2010 | Kojima et al. | |

FOREIGN PATENT DOCUMENTS

| | | | | |
|---|---|---|---|---|
| JP | 6-128514 | 5/1994 | | |
| JP | 2004-130792 | 4/2004 | | |
| JP | 2004-155868 | 6/2004 | | |
| JP | 2004269712 A | * 9/2004 | ................ | B41J 2/01 |
| JP | 2007-276387 | 10/2007 | | |

* cited by examiner

*Primary Examiner* — Manish S Shah
(74) *Attorney, Agent, or Firm* — Cooper & Dunham LLP

(57) ABSTRACT

An ink jet recording method including attaching a liquid dispersant in which an amphoteric polymer containing a core portion having an anion group and a shell portion having a cation group that covers the core portion is dispersed in a dispersing medium to a recording medium and discharging and attaching anionic ink containing a coloring material and water to the surface of the recording medium to which the liquid dispersant is attached.

7 Claims, No Drawings

INK JET RECORDING METHOD AND LIQUID DISPERSANT

CROSS-REFERENCE TO RELATED APPLICATIONS

This patent application is based on and claims priority pursuant to 35 U.S.C. §119 to Japanese Patent Application No. 2010-265209 filed on Nov. 29, 2010 in the Japan Patent Office, the entire disclosure of which is hereby incorporated by reference herein.

BACKGROUND OF THE INVENTION

1. Field of the Invention

The present invention is related to an ink jet recording method and a liquid dispersant.

2. Description of the Background Art

In response to demand for inexpensive recording of color images in recent years, ink jet recording methods in which ink of multiple different colors is adhered to recording media have become widely used. However, in comparison with recorded materials produced by electrophotography, the recorded material produced by such ink jet recording methods tend to have fine lines that lack sharpness or are susceptible to bleeding at the boundaries between colors. These defects stem from such characteristics as agglomeration and penetration of the ink after the ink is adhered to the recording medium, and accordingly various methods have been researched and developed in an effort to improve these characteristics.

For example, Japanese patent no. 3323565 (JP-3323565-B) describes a method of forming images by adhering a processing liquid that contains a water-soluble resin having a carboxyl group or a sulfone group to a recording medium and then adhering ink that contains an alkali-soluble resin to the processing liquid. By this method, the alkali-soluble resin contained in the ink precipitates upon contact with an acidic first liquid. As a result, the dye in the ink is fixed close to the surface of the recording medium, thereby preventing bleeding at the color boundaries to obtain quality images. However, if an acidic water-soluble resin is used for the processing liquid, modification tends to occur to the recording medium with prolonged preservation, thereby degrading the preservability of the recorded material.

Unexamined Japanese patent application publication no. 2004-130792 (JP-2004-130792-A) describes a recording method using a reaction liquid containing a polyvalent metal and a nonionic polymer and an ink that contains a coloring material, without employing an acidic water-soluble resin. According to this method, since the reaction liquid has the function of destabilizing a dissolved or dispersed state of the coloring material in the ink so that the nonionic polymer increases the adhesion property of accumulations of coloring material matters, with the result that images having excellent abrasion resistance and without color bleeding can be obtained. However, to stabilize multivalent metal ions in the reaction liquid, the reaction liquid must be acidic. In such a case, modification tends to occur to the recording medium as in JP-3323565-B described above and the preservability of the recorded material deteriorates. In addition, since the non-ionic water-soluble polymer as described in JP-2004-130792-A is re-dissolved even after forming a film, water-resistant and marker-resistant properties tend to be inferior.

In recent years, a recording method using a processing liquid that contains an amphoteric ionic polymer compound and a recording liquid that contains a coloring material have been proposed, as described in JP-2004-155868-A. Amphoteric ionic polymer compounds generally have minimum viscosity at the isoelectric point (the pH at which the average charge of the entire compound after ionization is zero). Therefore, by making the difference in pH between the pH of the recording liquid and the pH at the isoelectric point of the amphoteric ionic polymer compound larger than a predetermined value, the viscosity of the mixture of the processing liquid and the recording liquid formed when mixed on the recording medium suitably increases, thereby preventing occurrence of color bleeding.

However, in the method described above, fixing of the coloring material is not considered. As a result, abrasion resistance and marker resistance are not satisfactory. That is, if a processing liquid having an amphoteric polymer is used to prevent bleeding, the obtained adhesiveness is not satisfactory.

SUMMARY OF THE INVENTION

In view of the foregoing, the present invention provides an ink jet recording method including attaching a liquid dispersant in which an amphoteric polymer containing a core portion having an anion group and a shell portion having a cation group that covers the core portion is dispersed in a dispersion medium to the surface of a recording medium, and discharging and attaching anionic ink containing a coloring material and water to the surface of the recording medium where the liquid dispersant is attached.

It is preferred that, in the ink jet recording method mentioned above, the coloring material of the anionic ink contains an anion group.

It is still further preferred that the ink jet recording method mentioned above further includes a step of drying the liquid dispersant attached to the recording medium provided between the step of attaching the liquid dispersant and the step of discharging and attaching the anionic ink.

It is still further preferred that, in the ink jet recording method mentioned above, the amount of the liquid dispersant attached to the recording medium as measured by a dynamic scanning absorptometer is from 10 ml/m2 to 25 ml/m2 for a contact time of 100 ms.

It is still further preferred that, in the ink jet recording method mentioned above, the liquid dispersant further contains an aqueous organic solvent and a surface active agent.

It is still further preferred that, in the ink jet recording method mentioned above, the surface active agent is a silicone-based surface active agent.

As another aspect of the present invention, a liquid dispersant for use in an ink jet recording method is provided which contains a dispersion medium and an amphoteric polymer formed of a core portion having an anion group and a shell portion having a cation group that covers the core portion, which is dispersed in the dispersion medium.

DETAILED DESCRIPTION OF THE INVENTION

The ink jet recording method of the present disclosure is described in detail below. The ink jet recording method of the present disclosure includes a process of attaching a liquid dispersant (i.e., processing liquid) in which an amphoteric polymer having a core portion containing an anion group and a shell portion having a cation group which covers the core portion is dispersed in a dispersion medium to a recording medium and a process of discharging and attaching anionic ink containing a coloring material and water to the recording medium on which the liquid dispersant is attached.

The liquid dispersant and ink used in each process are sequentially described.

Processing Liquid (Liquid Dispersant)

The processing liquid for use in the ink jet recording method of the present disclosure contains an amphoteric polymer (i.e., a polymer having both an anion group and a cation group) and a dispersion medium. There is no specific limitation on the selection of the dispersion medium and any dispersion medium that disperses the amphoteric polymer can be suitably used. A polar solvent is preferable in terms of the dispersion property and water is particularly preferable.

An amphoteric polymer that has a core portion containing an anion group and a shell portion containing a cation group that covers the core portion is used as the amphoteric polymer to improve the fixing property. Typical cationic polymers and amphoteric polymers are expected to agglomerate anionic ink attached to a recording medium, typically paper. However, the interaction between the polymers contained in a coloring material and a liquid dispersant is not strong enough to obtain a satisfying fixing property.

On the other hand, when the liquid dispersant for use in the ink jet recording method of the present disclosure contacts anionic ink on a recording medium, part of the cationic charges in the shell portion of the amphoteric polymer is consumed to neutralization of the coloring material, which causes agglomeration. The rest of the cationic group causes electrostatic mutual action with the anionic group present in the molecule and attracts the coloring material, resulting in formation of firm agglomerated body. That is, since such a firm agglomerated body of the coloring material is formed on the recording medium after the ink attachment, feathering (spread of a single color to a recording medium) and bleeding (spread and mixing at color boundaries) can be reduced, resulting in production of recorded materials having an excellent fixing property.

In this way, by using a liquid dispersant that contains a polymer having a shell portion containing a charge (cation) reverse to that of the anionic ink, agglomeration occurs first by the neutralization of charges and then the coloring material is attracted by the electrostatic mutual action between the rest of the charges (cation) and the charge (anion) of the core portion, resulting in increase of the agglomeration effect. Therefore, high definition images with less bleeding and excellent abrasion resistance, water resistance, and marker resistance can be obtained.

The amphoteric polymer of the liquid dispersant for use in the ink jet recording method of the present disclosure also serves as a charge preventing agent. While an amphoteric surface active agent having a small molecular weight moves to the inside of a recording medium, the above-mentioned amphoteric polymer forms a particle so that the polymer tends to stay on the surface of the recording medium, thereby reducing the surface resistance of the recording medium. Therefore, it is possible to prevent occurrence of mis-feed of the recording medium and production of images defected by charged ink mist.

Next, an example of the method of manufacturing the amphoteric polymer is specified. There is no specific limitation to the selection of the manufacturing method. For example, methods using soap-free emulsification, emulsification polymerization, seed polymerization, or suspension polymerization can be suitably utilized.

To be specific, a polymerizable compound A having at least one kind of cationic group and a polymerizable compound C free from an anionic group and a cationic group are solution-polymerized to obtain a polymer A1. Any functional group that shows cationic property in an amphoteric polymer state can be used as the cation group. In addition, the functional group can be a non-neutralized functional group in the process of solution-polymerization. Furthermore, any functional group that shows anionic property in an amphoteric polymer state can be used as the anion group. In addition, the functional group can be a non-neutralized functional group in the process of solution-polymerization.

There is no specific limitation on the selection of the polymerizable compound A having a cationic group. Preferred specific examples thereof include, but are not limited to, α, β ethylene polymerizable compounds such as dimethyl amino methyl acrylate, diethyl amino methyl acrylate, dibutyl amino methyl acrylate, dihexyl amino methyl acrylate, dimethyl amino ethyl acrylate, diethyl amino ethyl acrylate, di(t-butyl)amino ethyl acrylate, diisohexyl amino ethyl acrylate, dihexyl amino propyl acrylate, and di(t-butyl)amino hexyl acrylate. These can be used alone or in combination.

There is no specific limitation on the selection of the polymerizable compound C free from anionic group and cationic group. Preferred specific examples thereof include, but are not limited to, such as monomers of α, β ethylene polymerizable compounds having no organic acid or amino group, such as alkyl or cycloalkyl esters of acrylic acid or methacrylic acid, methyl acrylate, methyl methacylate, ethyl acrylate, ethylmethacrylate, n-butylacrylate, n-butylmethacrylate, i-butyl acrylate, i-butyl methacrylate, t-butyl acrylate, t-butyl methacrylate, cyclohexyl acrylate, cyclohexyl methacrylate, 2-ethylhexyl acrylate, 2-ethylhexyl methacrylate, lauryl acrylate, and lauryl methacrylate; vinyl monomers such as styrene, vinyl toluene, α-methylstyrene, vinyl acetate, acrylonitrile, and methacrylonitrile; and hydroxyalkyl esters of acrylic acid or methacrylic acid such as 2-hydroxy ethylacrylate, 2-hydroxy ethyl methlacrylate, hydroxypropyl acrylate, and hydroxypropyl methacrylate. These can be used alone or in combination.

In this present disclosure, there is no specific limitation on the selection of a polymerization initiator to start the solution-polymerization. For example, azo-based initiators such as azobis isobutyl nitrile and peroxide compound-based polymerization initiators such as benzoyl peroxide can be suitably used.

After the polymer A1 is obtained, at least one kind of the anionic group containing polymerizable compound B is caused to react (neutralize) with the cation group in the polymer A1 with an equivalent ratio of anion to cation ranging from 0.1 to 1.5 to obtain a cationic polymerizable polymer A2. There is no specific limitation on the selection of the anionic group containing polymerizable compound B. α, β ethylene polymerizable compounds having an organic acid group are preferable. Specific examples thereof include, but are not limited to, acrylic acid, itaconic acid, maleic acid, t-butyl acrylic amide sulfonic acid, 2-acryloyloxy ethyl succinic acid, and 2-acryloyloxy ethyl phthalic acid. These can be used alone or in combination.

Furthermore, an emulsion of the amphoteric polymer having a cationic shell portion (polymer A2) having a cation group and an anionic core portion (copolymer of polymerizable compounds B and C) having an anion group can be obtained by emulsion-polymerizing the polymer A2 and non-reacted polymerizable compounds B and C. The emulsion of the amphoteric polymer preferably has a volume average particle diameter of from 60 nm to 200 nm and more preferably from 80 nm to 150 nm. When the volume average particle diameter is too small, the viscosity of the emulsion tends to increase, thereby increasing the viscosity of the liquid dispersant using this emulsion, which makes it difficult to apply the liquid dispersant to a recording medium or discharge it from a head to a recording medium for attachment of the emulsion thereto. To the contrary, when the volume average particle diameter is too large, the gloss of a recording medium to which the liquid dispersant has been applied may decrease.

The liquid dispersant for use in the ink jet recording method of the present disclosure may contain a surface active agent. A surface active agent that can control penetrating (spreading) to a recording medium without affecting the charge of the emulsion of the amphoteric polymer is suitably used. Specific examples of such surface active agents include, but are not limited to, nonionic surface active agents such as polyoxyethylene alkyl ether, acetylene glycol-based surface active agents, fluorine-containing surface active agents, and silicone-based surface active agents.

The processing liquid (liquid dispersant) for use in the ink jet recording method of the present disclosure may contain a water-soluble organic solvent to control moisture evaporation and the penetrating characteristics. There is no specific limitation on the selection of the water-soluble organic solvents and any known water-soluble organic solvents can be suitably used. Specific examples thereof include, but are not limited to, polyols, polyol alkyl ethers, polyol aryl ethers, nitrogen-containing heterocyclic compounds, amides, amines, sulfur-containing compounds, propylene carbonates, and ethylene carbonate.

Specific examples of the polyols include, but are not limited to, ethylene glycol, diethylene glycol, triethylene glycol, propylene glycol, dipropylene glycol, tripropylene glycol, 1,3-propane diol, 1,3-butane diol, 2,3-butane diol, 1,4-butane diol, 3-methyl-1,3-butane diol 1,5-pentane diol, tetraethylene glycol, 1,6-hexane diol, 3-methyl-1,5-pentane diol, 2-methyl-2,4-pentane diol, polyethylene glycol, glycerol, 1,2,6-hexane triol, 1,2,4-butane triol, 1,2,3-butane triol, and petriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether. Specific examples of the polyol aryl ethers include, but are not limited to, ethylene glycol monophenyl ether and ethylene glycol monobenzyl ether.

Specific examples of the nitrogen-containing heterocyclic compounds include, but are not limited to, 2-pyrolidone, N-methyl-2-pyrolidone, N-hydroxyethyle-2-pyrolidone, 1,3-dimethylimidazolidinone, and ε-caprolactam.

Specific examples of the amides include, but are not limited to, formamide, N-methylformamide, and N,N-dimethylformamide. Specific examples of the amines include, but are not limited to, monoethanol amine, diethanol amine, triethanol amine, monoethyl amine, diethylamine, and triethyl amine. Specific examples of the sulfur-containing compounds include, but are not limited to, dimethyl sulphoxide, sulfolane, and thiodiethanol.

These water-soluble organic solvents can be used alone or in combination.

The processing liquid for use in the ink jet recording method of the present disclosure for a recording medium preferably has a dynamic absorptivity of from 10 ml/m$^2$ to 25 ml/m$^2$ for a contact time of 100 ms at 25° C. and 50% RH and more preferably from 10 ml/m$^2$ to 20 ml/m$^2$. When the dynamic absorptivity is too small, the absorption of the processing liquid tends to deteriorate, which leads to bleeding when a recording liquid containing a coloring material is overlapped. To the contrary, when the dynamic absorptivity is too large, the processing liquid easily spreads into a recording medium so that when a recording liquid containing a coloring material is overlapped, the contact between the recording liquid and the processing liquid tends to decrease, resulting in unsatisfactory agglomeration and fixing. The dynamic absorptivity can be measured by a dynamic scanning absorptometer (K350 Series D type, manufactured by KYOWA SEIKO INC.).

The liquid dispersant for use in the ink jet recording method of the present disclosure preferably has a viscosity of from 5 mPA·s to 1,000 mPa·s. When the viscosity is too small, the liquid easily penetrates plain paper, which leads to unsatisfactory image quality after ink jet recording and an increased strike-through. When the viscosity is too large, application or discharging of the liquid dispersant to a recording medium tends to be difficult. The viscosity of the liquid dispersant can be adjusted by the addition amount of an organic solvent and/or water according to the used polymer emulsion.

The liquid dispersant for use in the ink jet recording method of the present disclosure preferably has a pH of from 4 to 10 and more preferably from 5 to 9. When the pH is too small, the recording medium tends to deteriorate over a prolonged preservation time. With regard to the upper limit of the pH, a strong alkali is not preferable considering safe handling and an applicator that contacts with the liquid.

The processing liquid for use in the ink jet recording method of the present disclosure can be attached to a recording medium by application by a roller or discharging from a head but the attachment method is not limited thereto. Specific examples of devices of drying the processing liquid after the attachment thereof include, but are not limited to, heat air drying and heat roller drying. It is preferable that ink should be attached before the processing liquid becomes dry and forms a film. In the ink jet recording method of the present disclosure, the anionic ink coloring material is agglomerated by charges (cation) having a reverse polarity to that of the anionic ink and then the coloring material is attracted by the electrostatic mutual function between the rest of the charges (cation) and the charges (anion) of the core portion, thereby boosting the agglomeration effect. Therefore, if the liquid dispersant becomes dry and forms a film first, the charges are canceled before the coloring material is attracted, which weakens the agglomeration effect of the coloring material.

Ink

The anionic ink for use in the ink jet recording method of the present disclosure contains a coloring material and water. An anionic coloring material is preferably used as the coloring material. Specific examples of the anionic coloring materials include, but are not limited to, dyes or pigments that contain a carboxyl group, a sulfonic acid group, a phosphoric acid group, a phosphonic acid group, a phenyl sulfonic acid group, and phenyl carboxyly group. Both free acid anion groups and neutralized salt anion groups can be suitably used.

The dyes having an anionic property include acidic dyes, basic dyes, reactive dyes, and food dyes. The aqueous dyes having an anion group are classified based on the color index thereof into acidic dyes, direct dyes, basic dyes, reactive dyes, and food dyes. Preferably, dyes having high water resistance and light resistance are used. Specific examples of such dyes include, but are not limited to, the following:

(Acidic dyes and food dyes): C. I. Acid Yellow 17, 23, 42, 44, 79, 142; C. I. Acid Red 1, 8, 13, 14, 18, 26, 27, 35, 37, 42, 52, 82, 87, 89, 92, 97, 106, 111, 114, 115, 134, 186, 249, 254, 289; C. I. Acid Blue 9, 29, 45, 92, 249; C. I. Acid Black 1, 2, 7, 24, 26, 94; C. I. Food Yellow 3, 4; C. I. Food Red 7, 9, 14; and C. I. Food Black 1, 2.

(Direct dyes): C. I. Direct Yellow 1, 12, 24, 26, 33, 44, 50, 86, 120, 132, 142, 144; C. I. Direct Red 1, 4, 9, 13, 17, 20, 28, 31, 39, 80, 81, 83, 89, 225, 227; C. I. Direct Orange 26, 29, 62, 102; C. I. Direct Blue 1, 2, 6, 15, 22, 25, 71, 76, 79, 86, 87, 90, 98, 163, 165, 199, 202; and C. I. Direct Black 19, 22, 32, 38, 51, 56, 71, 74, 75, 77, 154, 168, 171.

(Basic dyes): C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C. I. Basic Black 2, 8.

(Reactive dyes): C. I. Reactive Black 3, 4, 7, 11, 12, 17; C. I. Reactive Yellow 1, 5, 11, 13, 14, 20, 21, 22, 25, 40, 47, 51, 55, 65, 67; C. I. Reactive Red 1, 14, 17, 25, 26, 32, 37, 44, 46, 55, 60, 66, 74, 79, 96, 97, 180; and C. I. Reactive Blue 1, 2, 7, 14, 15, 23, 32, 35, 38, 41, 63, 80, 95.

As the anionic pigments, for example, pigments into which anion groups such as a carboxyl group, a phosphoric acid group, a phosphonic acid group, a phenyl sulfonic acid group, and a phenyl carboxyl group are directly introduced, pigments to which polymers having an anion group are adsorbed, and pigments contained by a polymer having an anion group can be used.

To introduce an anion group into a pigment directly, for example, a method of using an oxidized gas such as ozone to conduct gas-phase oxidation or a method of using a liquid oxidizing agent to conduct liquid-phase oxidation can be used. Specific examples of liquid oxidizing agents include, but are not limited to, hydrogen peroxide solution, iodine water, hypochlorites, persulfates, and permanganates.

To disperse a polymer in a pigment by adsorption, the polymer is dispersed with a typical polymer dispersing agent and a pigment using a homogenizer, a roll mill, and a bead mill A typical polymer dispersing agent is adsorbed to the surface of a pigment, disperses pigment agglomeration bodies upon application of a mechanical force, and keeps a stabilized state by repulsion of charges and steric effects. Specific examples of the polymer dispersing agents having such functions include, but are not limited to, polyacrylates and copolymers of polycarbonates.

As a method of containing pigments by a polymer having an anion group, the method described in JP-3882956-B is known.

Specific examples of the color pigments include, but are not limited to, phthalocyanine blue, phthalocyanine green, quinacridone, anthraquinone, perylene, (thio)indigoid, heterocyclic yellow, and pyranthrone.

Specific examples of the phthalocyanine blue include, but are not limited to, copper phthalocyanine blue and derivatives thereof (Pigment Blue 15, etc.). Specific examples of the quinacridones include, but are not limited to, Pigment Orange 48, Pigment Orange 49, Pigment Red 122, Pigment Red 192, Pigment red 202, Pigment Red 206, Pigment Red 207, Pigment Red 209, Pigment Violet 19, and Pigment Violet 42. Specific examples of the anthraquinone include, but are not limited to, Pigment Red 43, Pigment Red 194 (perinone red), Pigment Red 216 (brominated pyranthrone red), and Pigment Red 226 (pyranthrone red)). Specific examples of the perylene include, but are not limited to, Pigment Red 123 (vermilion), Pigment Red 149 (scarlet), Pigment Red 179 (maroon), Pigment Red 190 (Red), Pigment Violet, Pigment Red 189 (yellow shade red), and Pigment Red 224. Specific examples of the thioindigoid include, but are not limited to, Pigment Orange 86, Pigment Red 87, Pigment Red 88, Pigment Red 181, Pigment Red 198, Pigment Violet 36, and Pigment Violet 38. Specific examples of the heterocyclic yellow include, but are not limited to, Pigment Yellow 117 and Pigment Yellow 138.

Carbon black is used as black pigments. Other coloring pigments are specified in "The Colour Index, third edition" (published in 1982 by The Society of Dyers and Colourists). There is no specific limitation on the selection of the combination of the dyes and the pigments and the dispersion method.

The ink for use in the ink jet recording method of the present disclosure may contain an aqueous organic solvent, a surface active agent, a penetrating agent, a pH adjustment agent, and a corrosion control agent in addition to the coloring materials and water described above. There is no specific limitation on the selection of the water-soluble organic solvents and any known water-soluble organic solvents can be suitably used. Specific examples thereof include, but are not limited to, polyols, polyol alkyl ethers, polyol aryl ethers, nitrogen-containing heterocyclic compounds, amides, amines, sulfur-containing compounds, propylene carbonates, and ethylene carbonate.

Specific examples of the polyols include, but are not limited to, ethylene glycol, diethylene glycol, triethylene glycol, propylene glycol, dipropylene glycol, tripropylene glycol, 1,3-propane diol, 1,3-butane diol, 2,3-butane diol, 1,4-butane diol, 3-methyl-1,3-butane diol 1,5-pentane diol, tetraethylene glycol, 1,6-hexane diol, 3-methyl-1,5-pentane diol, 2-methyl-2,4-pentane diol, polyethylene glycol, glycerol, 1,2,6-hexane triol, 1,2,4-butane triol, 1,2,3-butane triol, and petriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether. Specific examples of the polyol aryl ethers include, but are not limited to, ethylene glycol monophenyl ether and ethylene glycol monobenzyl ether.

Specific examples of the nitrogen-containing heterocyclic compounds include, but are not limited to, 2-pyrolidone, N-methyl-2-pyrolidone, N-hydroxyethyle-2-pyrolidone, 1,3-dimethylimidazolidinone, and ε-caprolactam.

Specific examples of the amides include, but are not limited to, formamide, N-methyl formamide, and N,N-dimethyl formamide. Specific examples of the amines include, but are not limited to, monoethanol amine, diethanol amine, triethanol amine, monoethyl amine, diethylamine, and triethyl amine. Specific examples of the sulfur-containing compounds include, but are not limited to, dimethyl sulphoxide, sulfolane, and thiodiethanol.

These water-soluble organic solvents can be used alone or in combination. Among these, in terms of the solubility and the prevention of deterioration of jet characteristics caused by moisture evaporation, suitable solvents are glycerin, ethylene glycol, diethylene glycol, triethylene glycol, propylene glycol, dipropylene glycol, tripropylene glycol, 1,3-butane diol, 2,3-butane diol, 1,4-butane diol, 3-methyl-1,3-butane diol 1,5-pentane diol, tetraethylene glycol, 1,6-hexane diol, 3-methyl-1,5-pentane diol, 2-methyl-2,4-pentane diol, polyethylene glycol, 1,2,6 hexane triol, 1,2,4-butane triol, thiodiglycol, 2-pyrrolidone, N-methyl-2-pyrrolidone, and N-hydroxyethyl-2-pyrolidone.

The content of the water-soluble organic solvent in the ink is preferably from 15% to 40% by weight and more preferably from 20% to 35%. When the content is too small, the nozzle tends to become dry, thereby causing unsatisfactory discharging of droplets. When the content is too large, the viscosity of the ink tends to increase beyond the suitable viscosity range.

As the surface active agents, for example, anionic surface active agents, cationic surface active agents, nonionic surface active agents, amphoteric surface active agents, and fluorine-containing surface active agents can be used. These charge transport materials may be used alone or in combination.

Specific examples of the anion surface active agent include, but are not limited to, alkyl aryl, alkyl naphthalene sulfonic acid salts, alkyl phosophoric acid salts, alkyl sulfuric acid salts, alkyl sulphonic acid salts, alkyl ether sulfuric acid salts, alkyl sulpho succinic acid salts, alkyl ester sulfuric acid salts, alkyl benzene sulfonic acid salts, alkyl diphenyl ether disulphonic acid salts, alkyl aryl ether phosphoric acid salts, alkyl aryl ether sulfuric acid salts, alkyl aryl ether ester sulfuric acid salts, olefin sulfonic acid salts, alkane olefin sulfonic acid salts, polyoxyethylene alkyl ether phosphoric acid salts, polyoxyethylene alkyl ether sulfuric acid ester salts, ether carboxylate, sulfosuccinic acid salts, α-sulfoalicyclic acid esters, aliphatic acid salts, condensation products of a higher aliphatic acid and an amino acid, and naphthene acid salts.

Specific examples of the nonion surface active agent include, but are not limited to, acetylene glycol-based surface active agents, polyoxyethylene alkyl ethers, polyoxyethylene alkyl phenyl ethers, polyoxyethylene alkyl esters, and polyoxyethylene sorbitan aliphatic acid esters.

Specific examples of the cationic surface active agents include, but are not limited to, alkyl amine salts, dialkyl amine salts, aliphatic amine salts, benzalkonium salts, quaternary ammonium salts, alkyl pyridinium salts, imidazolinium salts, sulfonium salts, and phosphonium salts.

Specific examples of the amphoteric surface active agents include, but are not limited to, imidazoline derivatives such as imidazolinium betaine, dimethyl alkyl amyl betaine, alkyl glycine, and alkyl di(aminoethyl) glycine.

Diol compounds having 7 to 17 carbon atoms can be used as the penetrating agents mentioned above. By adding a penetrating agent, penetration to a recording medium is improved. Therefore, quality images can be formed without contamination caused by friction during paper transfer or by attachment of ink to a transfer belt when the recording face of a recording medium is reversed in duplicate mode. Specific examples of the diols include, but are not limited to, 2-ethyl-1,3-hexane diol and 2,2,4-trimethyl 1,3-pentane diol. The content of the diol compound in the ink is preferably from 1% to 5% by weight. When the content is too small, a satisfactory penetrating property is not easily obtained. By contrast, when the content is too large, the stability during preservation may deteriorate.

There is no specific limitation on the selection of the pH adjusting agent and any pH adjusting agent that can adjust pH to be 7 or higher without an adverse impact on ink can be used. Specific examples of such pH adjusting agents include, but are not limited to, amines such as diethanol amine and triethanol amine, hydroxides of alkali metal elements such as lithium hydroxide, sodium hydroxide, and potassium hydroxide; ammonium hydroxide, quaternary ammonium hydroxide, quaternary phosphonium hydroxide, and carbonates of alkali metals such as lithium carbonate, sodium carbonate, and potassium carbonate.

Specific examples of the corrosion control (anti-corrosion) agents include, but are not limited to, acid sulfite, thiosodium sulfate, ammonium thiodiglycolate, diisopropyl ammonium nitride, pentaerythritol quaternary nitride, dicyclohexyl ammonium nitride, and benzotriazole.

The viscosity of the ink for use in the ink jet recording method of the present disclosure is preferably from 5 mPa·s to 20 mPa·s at 25° C. and more preferably from 6 mPa·s to 12 mPa·s. When the viscosity is too large, the stability about discharging is not easily secured.

The surface tension of the ink for use in the ink jet recording method of the present disclosure is preferably from 23 mN/m to 40 mN/m at 20° C. When the surface tension is too weak, bleeding on a recording image may become apparent or discharging may not be stabilized. When the surface tension is too strong, ink penetration to a recording medium tends to be unsatisfactory, resulting in a long drying time for ink.

pH of the ink for use in the ink jet recording method of the present disclosure is preferably from 7 to 10. When the Ink is preserved for a long period of time, the properties thereof tend to change. In particular, when the ink is heated and preserved, the viscosity of the ink increases and pH thereof lowers. It is preferable to reduce such changes. In the case of this ink, it is preferable that the change of the viscosity is within 5% and the pH change is within −5% after two week's preservation of the ink at 60° C.

There is no specific limitation on the method of attaching ink for use in the ink jet recording method of the present disclosure to a recording medium by discharging. Any method of attaching the ink to the surface on which the processing liquid described above is attached can be suitably used. Preferably, attachment of the ink is conducted before the processing liquid becomes dry. If the ink is attached after the processing liquid becomes dry, satisfactory agglomeration effect is not easily obtained as described above, resulting in poor characteristics with regard to the image density, bleeding, feathering, etc. Therefore, it is preferable that the ink is attached immediately after the processing liquid is attached and thereafter the entire is dried.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but not limited thereto.

Liquid Dispersant

Processing Liquid

Synthesis Example 1

Synthesis of Emulsion of Amphoteric Polymer Having Anionic Core Portion and Cationic Shell Portion Place 50 g of ethanol in a flask equipped with a stiffer, a dripping funnel, a condenser, and a thermometer; Heat the system to 80° C. in a nitrogen atmosphere; Mix the following composition 1-1; Place it in the dripping funnel; Drop the composition 1-1 to the flask in three hours.

Composition 1-1:

| | |
|---|---|
| Azobis isobutyl nitrile | 10 g |
| Methyl methacrylate | 70 g |
| Butyl acrylate | 80 g |
| Dimethyl aminoethyl methacrylate | 50 g |

Subsequent to dropping, continue reaction for two more hours at 80° C. while stirring; Thereafter, cool down the product to 50° C.; Add 23 g of acrylic acid to the product; Dilute the resultant with 717 g of deionized water to obtain cationic polymerizable aqueous polymer A;

Place 500 g of the thus-obtained cationic polymerizable aqueous polymer A in a flask; Add 1 g of sodium ascorbate and 1 g of 5% aqueous solution of ferrous sulfate; Heat the system to 80° C. in a nitrogen atmosphere; Place the following composition 1-2 and the composition 1-3 in the dripping funnel: Simultaneously drop them to the flask in two hours;

Composition 1-2:

| | |
|---|---|
| Methyl methacrylate | 100 g |
| Butyl acrylate | 50 g |
| Styrene | 50 g |

Composition 1-3

| | |
|---|---|
| 35% Hydrogen peroxide solution | 1 g |
| Deionized water | 5 g |

And subsequent to dropping, keep the resultant at 80° C. for three hours while stirring followed by dilution with 247 g of deionized water to obtain an emulsion of an amphoteric polymer having an anionic core portion and a cationic shell portion.

Synthesis Example 2

Synthesis of Emulsion of Amphoteric Polymer which does not Employ Core-Shell Structure Place 120 g of isoparaffin having a boiling point of 190° C. and 7.5 g of sorbitan monooleate in a reaction container equipped with a stirrer and a temperature controller; Add 200 g of a liquid mixture of the following composition followed by stirring and emulsifying by a Homogenizer;

| Mixture | |
|---|---|
| Demineralized water | 165 g |
| Solution of acryloyloxy ethyl trimethyl ammonium chloride (99.7 mol %)•acrylic amide-2-methyl propane sulfonic acid soda (0.3 mol %) | 35 g |

Add 0.2 g of isopropyl alcohol to the thus-obtained emulsion; Add 0.04 g of dimethylazobis isobutylate; Complete the reaction at 50° C.; Thereafter, admix 7.5 g of polyoxyethylene nonylphenyl ether to obtain an emulsion of an amphoteric polymer; and Adjust the emulsion with deionized water such that the solid portion concentration is 30%.

Preparation of Processing Liquid

Processing Liquid is prepared by stirring and uniformly mixing the materials shown in Preparation Examples A to I in Tables 1-1 and 1-2. The blend amount of each material in Tables 1-1 and 1-2 is represented in parts by weight.

TABLE 1-1

| | | Processing Liquid (Liquid Dispersant) | | | | |
|---|---|---|---|---|---|---|
| | | Mfg. Example A | Mfg. Example B | Mfg. Example C | Mfg. Example D | Mfg Example E |
| Polymer | Synthesis Example 1 | 15 | | | 15 | |
| | Synthesis Example 2 | | 15 | | | |
| | UNISENCE FPA100L | | | 10 | | |
| | PAS-410SA | | | | | 20 |
| Water-soluble organic solvent | 1,3-butane diol | 15 | 15 | 15 | 15 | 15 |
| | 1,5-pentane diol | | | | | |
| Surface active agent | SOFTANOL EP7025 | 1 | 1 | 1 | | 1 |
| | BYK347 | | | | 1 | |
| | Zonyl FS3000 | | | | | |
| Water | Deionized water | 69 | 69 | 74 | 69 | 64 |
| | Total | 100 | 100 | 100 | 100 | 100 |

TABLE 1-2

| | | Processing Liquid (Liquid Dispersant) | | | |
|---|---|---|---|---|---|
| | | Mfg. Example F | Mfg. Example G | Mfg. Example H | Mfg. Example I |
| Polymer | Synthesis Example 1 | 15 | 15 | 15 | 15 |
| | Synthesis Example 2 | | | | |
| | UNISENCE FPA100L | | | | |
| | PAS-410SA | | | | |
| Water-soluble organic solvent | 1,3-butane diol | | 5 | | 30 |
| | 1,5-pentane diol | 20 | | | |
| Surface active agent | SOFTANOL EP7025 | | | 1 | |
| | BYK347 | | | | |
| | Zonyl FS3000 | 1 | 1 | | 1 |
| Water | Deionized water | 64 | 79 | 84 | 54 |
| | Total | 100 | 100 | 100 | 100 |

Product names shown in Table 1 represent as follows:
UNISENCE FPA100L: Cation polymer aqueous solution, Poly(diaryl dimethyl ammonium chloride) solution
PAS-410SA: Copolymers of Maleic acid, diaryldimethyl ammonium chloride, and sulfur dioxide
SOFTANOL EP7025: Nonion-based surface active agent
BYK347: Silicone-based surface active agent
Zonyl FS300: Fluorine-containing surface active agent Evaluation on Processing Liquid Characteristics of the obtained processing liquid are evaluated as follows: The results are shown in Tables 4-1, 4-2, 4-3, 4-4, 4-5, 4-6, 4-7, 4-8, 5-1, 5-2, 5-3, and 5-4.

Dynamic Absorptivity

The transfer (attached) amount of each processing liquid is measured using a dynamic scanning absorptometer (K350

Series D type, manufactured by Kyowa Seiko Inc.). The transfer amount (ml/m$^2$) of plain paper (My Paper, manufactured by NBS Ricoh Co., Ltd.) for a contact time of 100 ms is obtained. Measuring is conducted at 23° C. and 50% RH.

Ink

Polymer Liquid Dispersant 1

After replacement with nitrogen gas in a flask equipped with a mechanical stirrer, a thermometer, a nitrogen gas introducing tube, a reflux tube, and a dripping funnel, place 11.2 g of styrene, 2.8 g of acrylic acid, 12.0 g of lauryl methacrylate, 4.0 g of polyethlene glycol methacrylate, 4.0 g of styrene macromer (AS-6, manufactured by TOA GOSEI CO., LTD.), and 0.4 g of mercapto ethanol in the flask and heat the system to 65° C.; Drop a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (AS-6, manufactured by TOA GOSEI CO., LTD.), 3.6 g of mercapto ethanol, 2.4 g of azobisdimethyl valeronitrile, and 18 g of methylethyl ketone in the flask in two and a half hours; After dropping, drop a liquid mixture of 0.8 g of azobis dimethyl valeronitrile and 18 g of methylethyl ketone to the flask in half an hour; After one-hour aging at 65° C., add 0.8 g of azobisdimethyl valeronitrile followed by another one-hour aging; After the reaction is complete, add 364 g of methylethyl ketone to the flask to obtain 800 g of a polymer solution having a concentration of 50% (Polymer liquid dispersant 1).

Preparation Example 1

Preparation of Carbon Black Pigment Containing Polymer Particulate Dispersant Body Sufficiently stir 28 g of polymer liquid dispersant 1, 26 g of carbon black (specific surface area: 230 m$^2$/g and DBP oil absorption amount: 70 ml/100 g), 13.6 g of 1 mol/l potassium hydroxide solution, 20 g of methylethyl ketone, and 30 g of deionized water; Mix and knead the mixture using a three-roll mill; Place the thus-obtained paste in 200 g of deionized water; and subsequent to sufficient stirring, distill away methylethyl ketone and water using an evaporator to obtain a black polymer particulate dispersant body.

Preparation Example 2

Preparation of Phthalocyanine Pigment Containing Polymer Particulate Dispersant Body Cyan polymer particulate dispersant body is obtained in the same manner as in Preparation Example 1 except that the carbon black pigment in Preparation Example 1 is replaced with a phthalocyanine pigment (C.I. Pigment 15:3).

Preparation Example 3

Preparation of Dimethyl Quinacridone Pigment Containing Polymer Particulate Dispersant Body Magenta polymer particulate dispersant body is obtained in the same manner as in Preparation Example 1 except that the carbon black pigment in Preparation Example 1 is replaced with Pigment Red 122.

Preparation Example 4

Preparation of Monoazo Yellow Pigment Containing Polymer Particulate Dispersant Body Yellow polymer particulate dispersant body is obtained in the same manner as in Preparation Example 1 except that the carbon black pigment in Preparation Example 1 is replaced with Pigment Yellow 74.

Manufacturing Example of Ink

Uniformly mix each material shown in Manufacturing Examples 1 to 8 in Tables 2-1 and 2-2 by stirring and thereafter adjust it by sodium hydroxide such that pH is 9; and filter the mixture with a membrane filter having an average opening diameter of 0.8 μm to manufacture ink. The blend ratios of each material in Tables 2-1 and 2-2 are represented in parts by weight.

TABLE 2-1

|  |  | Ink | | | |
|---|---|---|---|---|---|
|  |  | Manufacturing Example 1 | Manufacturing Example 2 | Manufacturing Example 3 | Manufacturing Example 4 |
| Coloring material | Pigment dispersant body of Preparation Example 1 *1 | 8 | | | |
|  | Pigment dispersant body of Preparation Example 2 *1 | | 6 | | |
|  | Pigment dispersant body of Preparation Example 3 *1 | | | 5 | |
|  | Pigment dispersant body of Preparation Example 4 *1 | | | | 5 |
|  | Direct Black | | | | |

TABLE 2-1-continued

| | | Ink | | | |
|---|---|---|---|---|---|
| | | Manufacturing Example 1 | Manufacturing Example 2 | Manufacturing Example 3 | Manufacturing Example 4 |
| | 168 Direct Blue 86 Acid Red 249 Direct Yellow 142 | | | | |
| Water-soluble organic solvent | Glycerin | 10 | 10 | 10 | 10 |
| | 1,5-pentane diol | | | 25 | 25 |
| | 1,3-butane diol | 22 | 27 | | |
| | 2-pyrolidone | 2 | | 5 | 5 |
| Penetrating agent | 2-ethyl-1,3-hexane diol | 2 | 2 | 2 | 2 |
| Surface active agent | Zonyl FS300 *2 | 1 | 1 | 1 | 1 |
| Water | Deionized water | 55 | 54 | 52 | 52 |
| | Total | 100 | 100 | 100 | 100 |

TABLE 2-2

| | | Ink | | | |
|---|---|---|---|---|---|
| | | Manufacturing Example 5 | Manufacturing Example 6 | Manufacturing Example 7 | Manufacturing Example 8 |
| Coloring material | Pigment dispersant body of Preparation Example 1 *1 | | | | |
| | Pigment dispersant body of Preparation Example 2 *1 | | | | |
| | Pigment dispersant body of Preparation Example 3 *1 | | | | |
| | Pigment dispersant body of Preparation Example 4 *1 | | | | |
| | Direct Black 168 | 5 | | | |
| | Direct Blue 86 | | 3 | | |
| | Acid Red 249 | | | 2 | |
| | Direct Yellow 142 | | | | 2 |
| Water-soluble organic solvent | Glycerin | 10 | 10 | 10 | 10 |
| | 1,5-pentane diol | 30 | | | |
| | 1,3-butane diol | | 32 | 35 | 35 |
| | 2-pyrolidone | | | | |
| Penetrating agent | 2-ethyl-1,3-hexane diol | 2 | 2 | 2 | 2 |
| Surface active agent | Zonyl FS300 *2 | 1 | 1 | 1 | 1 |
| Water | Deionized water | 52 | 52 | 50 | 50 |
| | Total | 100 | 100 | 100 | 100 |

*1: Blend ratio of solid portion
*2: Fluorine-containing surface active agent.

Evaluation of Ink

Characteristics of the obtained ink are evaluated as follows: The results are shown in Table 3.

Viscosity

Measure the viscosity of the ink at 25° C. using R type viscometer (manufactured by TOKI SANGYO CO., LTD.).

Surface Tension

Measure the viscosity of the ink at 20° C. to 26° C. using a static surface tensiometer (BVP-Z, manufactured by KYOWA INTERFACE SCIENCE Co., Ltd.).

pH

Measure pH of the ink at 25° C. using a pH meter (HM30R, manufactured by DKK-TOA CORPORATION).

Preservability

Place ink in a polypropylene bin (50 ml) and preserve it at 50° C. for one month. Take it out from the bin, leave it for one day, and measure the viscosity change. Evaluate the preservability according to the following criteria:

Evaluation Criteria

G (Good): between ±3% (not inclusive) change from the initial viscosity

F (Fair): ±3% to ±6% (not inclusive) change from the initial viscosity

P (Poor): ±6% or more change from the initial viscosity

TABLE 3

| | Ink | | | | | | | |
|---|---|---|---|---|---|---|---|---|
| | Mfg. Example 1 | Mfg. Example 2 | Mfg. Example 3 | Mfg. Example 4 | Mfg. Example 5 | Mfg. Example 6 | Mfg. Example 7 | Mfg. Example 8 |
| Viscosity mPa·s | 8.3 | 7.6 | 7.8 | 7.3 | 7.4 | 7.2 | 7.4 | 7.2 |
| pH | 9 | 9 | 9 | 9 | 9 | 9 | 9 | 9 |
| Surface tension mN/m | 26.5 | 25.2 | 25.3 | 25.6 | 25.6 | 25.1 | 25.4 | 25.4 |
| Preservability | G | G | G | G | G | G | G | G |

Image Evaluation Application of Processing Liquid

Apply the obtained processing liquid to plain paper (My paper. manufactured by NBS Ricoh Co., Ltd.) using a bar coater (No. 5). The applied amount is 3 g/m$^2$ in a wet state.

Image Output

Set the paper to which the processing liquid is applied in an ink jet printer IPSiO GX5000 (manufactured by Ricoh Co., Ltd.) quickly and conduct recording using each ink shown in Examples 1 to 8 and Comparative Examples 1 to 4 in Tables 4-1, 4-2, 4-3, 4-4, 4-5, 4-6, 4-7, 4-8, 5-1, 5-2, 5-3, and 5-4 with a definition of 600 dpi. The attached amount of ink is 9.5 g/m$^2$ in a wet state. Example 8 is conducted in the same manner as in Example 1 except that a process of drying the processing liquid attached to plain paper for 10 seconds at 120° C. is provided between the process of attaching the processing liquid to the plain paper and the process of attaching the ink. The output images are evaluated as follows: The results are shown in Tables 4-1, 4-2, 4-3, 4-4, 4-5, 4-6, 4-7, 4-8, 5-1, 5-2, 5-3, and 5-4.

Image Feathering

Feathering of the recorded images is observed with naked eyes and evaluated according to the following criteria.

Evaluation Criteria

G (Good): Vivid images without feathering

F (Fair): Feathering occurs locally

B (Bad): Feathering occurs to a degree that the contour of texts is not clear.

Image Density

Dry the recorded image sufficiently, measure the image density using a reflection type color spectrodensitometer (manufactured by X-RITE CORPORATION), and evaluate the image density according to the following criteria:

Evaluation Criteria

Black Ink

E (Excellent): 1.40 or higher

G (Good): 1.35 to less than 1.40

F (Fair): 1.30 to less than 1.35B (Bad): Less than 1.30

Cyan Ink

E (Excellent): 1.3 or higher

G (Good): 1.25 to less than 1.30

F (Fair): 1.20 to less than 1.25

B (Bad): Less than 1.20

Magenta Ink

E (Excellent): 1.20 or higher

G (Good): 1.15 to less than 1.20

F (Fair): 1.10 to less than 1.15

B (Bad): Less than 1.10

Yellow Ink

E (Excellent): 1.00 or higher

G (good): 0.95 to less than 1.00

F (Fair): 0.90 to less than 0.95

B (Bad): Less than 0.90

Strike-Through Density

Dry the recorded image sufficiently, measure the strike-through density of images using a reflection type color spectrodensitometer (manufactured by X-RITE CORPORATION), and evaluate according to the following criteria:

Evaluation Criteria

G (Good): Less than 0.10

F (Fair): 0.10 to less than 0.15

B (Bad): 0.15 or higher

Scratch

Leave the recorded image at 25° C. and 50% RH for five hours, scratch the solid image portion with cotton cloth ten times, observe the transfer state of the pigment to the cotton cloth with naked eyes, and evaluate the image according to the following criteria:

Evaluation Criteria

E (Excellent): No transfer of pigment to cotton cloth observed by naked eyes

G (Good): Transfer of pigment to cotton cloth barely observed

F (Fair): Transfer of pigment to cotton cloth slightly observed

B (Bad): Transfer of pigment to cotton cloth apparently observed

Marker Resistance

Leave the recorded image at 25° C. and 50% RH for ten minutes, follow the text portion by a fluorescent marker (PROPUS2, manufactured by MITSUBISHI PENCIL CO., LTD.), observe the degree of contamination caused by scratch by the marker with naked eyes, and evaluate the image according to the following criteria.

Evaluation Criteria

G (Good): No contamination observed by loss of color

F (Fair): Slight contamination observed by loss of color

B (Bad): Contamination observed along the marker.

Bleeding

Record a pattern containing texts in black in a color solid portion, observe bleeding at the boundary of color and black, and evaluate the image according to the following criteria.

Evaluation Criteria

G (Good): No bleeding observed at the color boundary

F (Fair): Slight bleeding observed by loss of color depending on the color

B (Bad): Bleeding observed clearly at most color boundaries

Duplex Printing Property

Set the paper to which the processing liquid is applied in an ink jet printer IPSiO GX5000 (manufactured by Ricoh Co., Ltd.) quickly and conduct duplex recording using each ink shown in Examples 1 to 8 and Comparative Examples 1 to 4 with a definition of 600 dpi. In the recording, reverse the paper immediately after an image is recorded on one side. Conduct this operation for 10 sheets in a row and scratch ink thereon when reversing the paper and evaluate the paper contamination according to the following criteria:

Evaluation Criteria

G (Good): No ink contamination observed when reversing recording medium

F (Fair): Slight but not apparent ink contamination observed for one or two sheets when reversing recording medium B (Bad): Ink contamination caused by scratching during reversing sheet apparently observed when reversing recording medium.

Discharging Misplacement

Set the paper to which the processing liquid is applied in an ink jet printer IPSiO GX5000 (manufactured by Ricoh Co., Ltd.) quickly and conduct dot recording using each ink shown in Examples 1 to 8 and Comparative Examples 1 to 4 with a definition of 600 dpi at 28° C. and 10% RH. Observe the recorded portion with a microscope and evaluate dot misplacement.

Evaluation Criteria

G (Good): No dot misplacement observed

F (Fair): Dot misplacement slightly observed but not apparent in terms of recording B (Bad): Dot misplacement observed significantly and streaks on the recorded image observed apparently

TABLE 4-1

| | Example 1 | | | |
|---|---|---|---|---|
| Ink | Manufacturing Example 1 Anion | Manufacturing Example 2 Anion | Manufacturing Example 3 Anion | Manufacturing Example 4 Anion |
| Processing liquid | Manufacturing Example A | | | |
| Core portion | Anion | | | |
| Shell portion | Cation | | | |
| Dynamic absorptivity characteristics | 18 | | | |
| Evaluation of recorded images | | | | |
| Image density | E | E | E | E |
| Strike-through | G | G | G | G |
| Feathering | G | G | G | G |
| Scratch | G | G | G | G |
| Marker resistance | G | G | G | G |
| Duplex printing property | G | G | G | G |
| Bleeding | — | G | G | G |
| Discharging misplacement | G | G | G | G |

TABLE 4-2

| | Example 2 | | | |
|---|---|---|---|---|
| Ink | Manufacturing Example 1 Anion | Manufacturing Example 2 Anion | Manufacturing Example 3 Anion | Manufacturing Example 4 Anion |
| Processing liquid | Manufacturing Example D | | | |
| Core portion | Anion | | | |
| Shell portion | Cation | | | |
| Dynamic absorptivity characteristics | 15 | | | |
| Evaluation of recorded images | | | | |
| Image density | E | E | E | E |
| Strike-through | G | G | G | G |
| Feathering | G | G | G | G |
| Scratch | G | G | G | G |
| Marker resistance | G | G | G | G |
| Duplex printing property | G | G | G | G |
| Bleeding | — | G | G | G |
| Discharging misplacement | G | G | G | G |

TABLE 4-3

| | Example 3 | | | |
|---|---|---|---|---|
| Ink | Manufacturing Example 1 Anion | Manufacturing Example 2 Anion | Manufacturing Example 3 Anion | Manufacturing Example 4 Anion |
| Processing liquid | Manufacturing Example F | | | |
| Core portion | Anion | | | |
| Shell portion | Cation | | | |
| Dynamic absorptivity characteristics | 25 | | | |
| Evaluation of recorded image | | | | |
| Image density | F | F | F | F |
| Strike-through | G | G | G | G |
| Feathering | G | G | G | G |
| Scratch | G | G | G | G |
| Marker resistance | G | G | G | G |
| Duplex printing property | G | G | G | G |
| Bleeding | — | G | G | G |
| Discharging misplacement | G | G | G | G |

TABLE 4-4

| | Example 4 | | | |
|---|---|---|---|---|
| Ink | Manufacturing Example 1 Anion | Manufacturing Example 2 Anion | Manufacturing Example 3 Anion | Manufacturing Example 4 Anion |
| Processing liquid | Manufacturing Example G | | | |
| Core portion | Anion | | | |
| Shell portion | Cation | | | |
| Dynamic absorptivity characteristics | 10 | | | |

TABLE 4-4-continued

| | Example 4 | | | |
|---|---|---|---|---|
| Ink | Manufacturing Example 1 Anion | Manufacturing Example 2 Anion | Manufacturing Example 3 Anion | Manufacturing Example 4 Anion |
| | Evaluation of recorded image | | | |
| Image density | E | E | E | E |
| Strike-through | G | G | G | G |
| Feathering | F | F | F | F |
| Scratch | G | G | G | G |
| Marker resistance | G | G | G | G |
| Duplex printing property | G | G | G | G |
| Bleeding | — | G | G | G |
| Discharging misplacement | G | G | G | G |

TABLE 4-5

| | Example 5 | | | |
|---|---|---|---|---|
| | Manufacturing Example 5 Anion | Manufacturing Example 6 Anion | Manufacturing Example 7 Anion | Manufacturing Example 8 Anion |
| Processing liquid | Manufacturing Example A | | | |
| Core portion | Anion | | | |
| Shell portion | Cation | | | |
| Dynamic absorptivity characteristics | 18 | | | |
| | Evaluation of recorded images | | | |
| Image density | G | G | G | G |
| Strike-through | G | G | G | G |
| Feathering | G | G | G | G |
| Scratch | E | E | E | E |
| Marker resistance | G | G | G | G |
| Duplex printing property | G | G | G | G |
| Bleeding | — | G | G | G |
| Discharging misplacement | G | G | G | G |

TABLE 4-6

| | Example 6 | | | |
|---|---|---|---|---|
| Ink | Manufacturing Example 1 Anion | Manufacturing Example 2 Anion | Manufacturing Example 3 Anion | Manufacturing Example 4 Anion |
| Processing liquid | Manufacturing Example H | | | |
| Core portion | Anion | | | |
| Shell portion | Cation | | | |
| Dynamic absorptivity characteristics | 7 | | | |
| | Evaluation of recorded images | | | |
| Image density | G | G | G | G |
| Strike-through | G | G | G | G |
| Feathering | F | F | F | F |
| Scratch | G | G | G | G |
| Marker resistance | G | G | G | G |

TABLE 4-6-continued

| | Example 6 | | | |
|---|---|---|---|---|
| Ink | Manufacturing Example 1 Anion | Manufacturing Example 2 Anion | Manufacturing Example 3 Anion | Manufacturing Example 4 Anion |
| Duplex printing property | G | G | G | G |
| Bleeding | — | F | F | F |
| Discharging misplacement | G | G | G | G |

TABLE 4-7

| | Example 7 | | | |
|---|---|---|---|---|
| Ink | Manufacturing Example 1 Anion | Manufacturing Example 2 Anion | Manufacturing Example 3 Anion | Manufacturing Example 4 Anion |
| Processing liquid | Manufacturing Example I | | | |
| Core portion | Anion | | | |
| Shell portion | Cation | | | |
| Dynamic absorptivity characteristics | 30 | | | |
| | Evaluation of recorded image | | | |
| Image density | G | G | G | G |
| Strike-through | F | F | F | F |
| Feathering | G | G | G | G |
| Scratch | F | F | F | F |
| Marker resistance | F | F | F | F |
| Duplex printing property | G | G | G | G |
| Bleeding | — | G | G | G |
| Discharging misplacement | G | G | G | G |

TABLE 4-8

| | Example 8 | | | |
|---|---|---|---|---|
| Ink | Manufacturing Example 1 Anion | Manufacturing Example 2 Anion | Manufacturing Example 3 Anion | Manufacturing Example 4 Anion |
| Processing liquid | Manufacturing Example A | | | |
| Core portion | Anion | | | |
| Shell portion | Cation | | | |
| Dynamic absorptivity characteristics | 18 | | | |
| | Evaluation of recorded image | | | |
| Image density | G | G | G | G |
| Strike-through | F | F | F | F |
| Feathering | F | F | F | F |
| Scratch | G | G | G | G |
| Marker resistance | G | G | G | G |
| Duplex printing property | G | G | G | G |
| Bleeding | — | F | F | F |
| Discharging misplacement | G | G | G | G |

TABLE 5-1

Comparative Example 1

| Ink | Manufacturing Example 1 Anion | Manufacturing Example 2 Anion | Manufacturing Example 3 Anion | Manufacturing Example 4 Anion |
|---|---|---|---|---|
| Processing liquid | Manufacturing Example B | | | |
| Core portion | — | | | |
| Shell portion | — | | | |
| Dynamic absorptivity characteristics | 12 | | | |
| Evaluation of recorded image | | | | |
| Image density | G | G | G | G |
| Strike-through | F | F | F | F |
| Feathering | G | G | G | G |
| Scratch | B | B | B | B |
| Marker resistance | B | B | B | B |
| Duplex printing property | F | F | F | F |
| Bleeding | — | F | F | F |
| Discharging misplacement | G | G | G | G |

TABLE 5-2

Comparative Example 2

| Ink | Manufacturing Example 1 Anion | Manufacturing Example 2 Anion | Manufacturing Example 3 Anion | Manufacturing Example 4 Anion |
|---|---|---|---|---|
| Processing liquid | Manufacturing Example C | | | |
| Core portion | — | | | |
| Shell portion | — | | | |
| Dynamic absorptivity characteristics | 30 | | | |
| Evaluation of recorded image | | | | |
| Image density | F | F | F | F |
| Strike-through | F | F | F | F |
| Feathering | F | F | F | F |
| Scratch | B | B | B | B |
| Marker resistance | B | B | B | B |
| Duplex printing property | F | F | F | F |
| Bleeding | — | F | F | F |
| Discharging misplacement | G | G | G | G |

TABLE 5-3

Comparative Example 3

| Ink | Manufacturing Example 1 Anion | Manufacturing Example 2 Anion | Manufacturing Example 3 Anion | Manufacturing Example 4 Anion |
|---|---|---|---|---|
| Processing liquid | Manufacturing Example E | | | |
| Core portion | — | | | |
| Shell portion | — | | | |
| Dynamic absorptivity characteristics | 32 | | | |
| Evaluation of recorded image | | | | |
| Image density | F | F | F | F |
| Strike-through | F | F | F | F |
| Feathering | F | F | F | F |
| Scratch | B | B | B | B |
| Marker resistance | B | B | B | B |
| Duplex printing property | F | F | F | F |
| Bleeding | — | F | F | F |
| Discharging misplacement | G | G | G | G |

TABLE 5-4

Comparative Example 4

| Ink | Manufacturing Example 1 Anion | Manufacturing Example 2 Anion | Manufacturing Example 3 Anion | Manufacturing Example 4 Anion |
|---|---|---|---|---|
| Processing liquid | — | | | |
| Core portion | — | | | |
| Shell portion | — | | | |
| Dynamic absorptivity characteristics | — | | | |
| Evaluation of recorded image | | | | |
| Image density | F | B | B | B |
| Strike-through | B | B | B | B |
| Feathering | F | F | F | F |
| Scratch | F | F | F | F |
| Marker resistance | F | F | F | F |
| Duplex printing property | F | F | F | F |
| Bleeding | — | F | F | F |
| Discharging misplacement | G | G | G | G |

What is claimed is:

1. An ink jet recording method comprising the steps of:
   attaching a processing liquid in which an amphoteric polymer comprising a core portion having an anion group and a shell portion having a cation group that covers the core portion is dispersed in a dispersion medium to a surface of a recording medium; and
   discharging and attaching anionic ink comprising a coloring material and water to the surface of the recording medium where the processing liquid is attached,
   wherein an amount of the processing liquid attached to the recording medium as measured by a dynamic scanning absorptometer is from 10 ml/m$^2$ to 25 ml/m$^2$ for a contact time of 100 ms, and
   wherein the step of attaching a processing liquid is performed prior to the step of discharging and attaching anionic ink.

2. The ink jet recording method according to claim 1, wherein the coloring material of the anionic ink comprises an anion group.

3. The ink jet recording method according to claim 1 further comprising a step of drying the processing liquid attached to the recording medium provided between the step of attaching the processing liquid and the step of discharging and attaching the anionic ink.

4. The ink jet recording method according to claim 1, wherein the processing liquid further comprises an aqueous organic solvent and a surface active agent.

5. The ink jet recording method according to claim 4, wherein the surface active agent is a silicone-based surface active agent.

6. The ink jet recording method according to claim 1, wherein the amphoteric polymer is manufactured by polymerizing a first polymerizable compound with a second polymerizable compound, reacting with a third polymerizable compound, and polymerizing with both the second polymerizable compound and the third polymerizable compound.

7. The ink jet recording method according to claim 6, wherein the first polymerizable compound is a compound having at least one kind of cationic group, the second polymerizable compound is a compound free from an anionic group and a cationic group, and the third polymerizable compound is a compound having at least one kind of anionic group.

* * * * *